United States Patent Office 2,702,816
Patented Feb. 22, 1955

2,702,816

PRODUCTION OF FORMISOBUTYRALDOL CYANOHYDRIN

Howard C. Klein and Saul Chodroff, Brooklyn, N. Y., assignors to Nopco Chemical Company, Harrison, N. J., a corporation of New Jersey No Drawing. Application March 9, 1950,
Serial No. 148,738

9 Claims. (Cl. 260—465.6)

This invention relates to the production of pantothenic acid and more particularly to a process for producing alpha - hydroxy - beta,beta - dimethyl - gamma - butyrolactone which is an intermediate compound employed in the production of pantothenic acid.

One of the most recent proposals for producing alpha - hydroxy - beta,beta - dimethyl - gamma - butyrolactone involves condensing isobutyraldehyde with formaldehyde in aqueous solution in the presence of aqueous alkali cyanide in an amount sufficient to form a mixture of formoisobutyraldol and at the same time provide a sufficient amount of cyanide for subsequent conversion of the formoisobutyraldol to its cyanohydrin, and thereafter hydrolyzing the cyanohydrin to produce alpha - hydroxy - beta,beta - dimethyl - gamma - butyrolactone. This procedure may be illustrated by the following series of reactions:

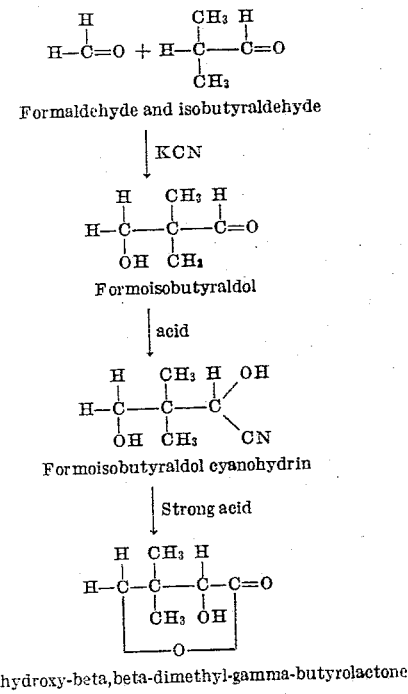

In this process it is necessary to employ the rather toxic alkali cyanides. Due both to their high alkalinity and to their extreme toxicity, the alkali cyanides are highly undesirable reactants to employ. Furthermore, this process requires the use of aqueous formaldehyde which is a rather malodorous composition and a very disagreeable substance to handle.

It is the object of this invention to provide an improved process for producing alpha-hydroxy-beta,beta-dimethyl-gamma-butyrolactone.

A further object of the invention is to provide a process for producing alpha-hydroxy-beta,beta-dimethyl-gamma-butyrolactone which utilizes reactants which are less toxic than the reactants employed in the prior art processes.

Another object of the invention is to provide a process for producing alpha-hydroxy-beta,beta-dimethyl-gamma-butyrolactone which employs reactants which are far more desirable to handle than the reactants employed in the prior art processes.

Other objects of the invention will in part be obvious and will in part appear hereinafter.

The above and other objects of the invention are accomplished by a process comprising reacting glycolonitrile with isobutyraldehyde in the presence of an alkaline condensing agent such as sodium hydroxide, potassium hydroxide, calcium hydroxide, etc. to produce formoisobutyraldol cyanohydrin which is then converted to alpha-hydroxy-beta,beta-dimethyl-gamma-butyrolactone by hydrolysis with a strong acid as in the prior art procedures.

The process of the invention eliminates the use of the highly toxic and highly alkaline alkali cyanide salts or the use of the highly poisonous liquid hydrogen cyanide which is employed in some prior art procedures. It also eliminates the use of formaldehyde which has a substantial degree of toxicity, which is objectionable to work with because of its malodorous nature, and which is rather unstable chemically since the solutions thereof tend to deteriorate if stored for any substantial period of time. The glycolonitrile which is employed in the process of the invention in place of formaldehyde and an alkali cyanide is readily available commercially in the form of stable concentrated aqueous solutions thereof and it is much more desirable to handle than formaldehyde and the various cyanide salts. Also it is less toxic and less malodorous than the prior art reactants.

In carrying out the process of the invention, the reactants and the alkaline condensing agent are admixed in any desirable manner. Preferably, the alkali and the concentrated aqueous solution of the glycolonitrile are first admixed with each other and thereafter the isobutyraldehyde is added thereto. If desired, however, the glycolonitrile and the isobutyraldehyde may be admixed prior to adding the alkaline condensing agent to the mixture. The alkali is preferably added in the form of a concentrated aqueous solution thereof. Since the reaction between the glycolonitrile and the isobutyraldehyde is quite exothermic, suitable means for cooling the reaction mixture should be provided so as to keep the reaction under control. The reactants and the alkaline condensing agent are admixed at a temperature not above about room temperature and preferably at a temperature somewhat below room temperature, e. g. 5° to 10° C., and sufficient cooling is provided to maintain the temperature of the reaction mixture at or below room temperature until the reactants and the condensing agent have been completely admixed. The reaction proceeds quite rapidly and ordinarily will be complete as soon as all of the reactants and the alkaline condensing agent have been incorporated into the reaction mixture. In order, however, to insure completion of the reaction it is desirable to agitate the reaction mixture for about an hour or so.

The ratios of the two reactants should be approximately an equimolecular ratio with the isobutyraldehyde preferably being employed in a very slight excess, e. g. approximately a 5% excess. The amount of alkali which is utilized as the alkaline condensing agent may vary but in most cases it is preferred to employ approximately the same equivalent quantity of alkali as the amount of glycolonitrile being utilized. Any alkali metal hydroxide or alkaline earth metal hydroxide, e. g. sodium hydroxide, potassium hydroxide, calcium hydroxide, barium hydroxide, etc. can serve as the alkaline condensing agent.

As the reactants and the condensing agent are admixed, small amounts of solids will form in the reaction mixture but as the reaction proceeds these solids usually disperse to some extent and in some cases form a small amount of oily material on the surface of the reaction mixture. These solids and the oily material are presumably the alkali salt of the cyanohydrin. The cyanohydrin which is formed by the process of the invention is then converted to the desired lactone by hydrolysis with a strong acid such as hydrochloric acid, sulfuric acid, phosphoric acid, etc. as in the prior art procedures.

In most cases in the condensation reaction, various glycols are formed as by-products of the reaction. In order to eliminate these undesirable glycols from the reaction mixture after the formation of the desired lactone, the strongly acidic reaction mixture is made strongly alkaline with a suitable alkali, e. g. sodium or potassium hydroxide, to convert the desired lactone to the alkali salt thereof and then the alkaline mixture is subjected to steam distillation to remove from the reaction mixture all of the undesired glycols which were formed as by-products of the condensation reaction. After removal of the glycols, the mixture is again strongly acidified with a suitable acid to reconvert the alkaline salts of the lactone to the lactone. The lactone is then readily recovered from this acid mixture by extraction of the lactone from the aqueous reaction mixture with a suitable solvent such as ether, acetone, isopropyl acetate, etc. If desired this acid mixture may be neutralized prior to the solvent extraction step. Evaporation of the solvent from the solvent extract gives the desired lactone in a very high state of purity. Some of the prior art processes have omitted this step of eliminating the glycols produced as by-products and therefore the percentage yields reported in such prior art processes are substantially higher than would be the case if such glycols were eliminated from the reaction mixture inasmuch as the glycols produced by the side reactions have in many cases boiling points which are substantially identical with the boiling point of the desired lactone.

For a fuller understanding of the nature and objects of the invention, reference may be had to the following examples which are given merely as further illustrations of the invention and are not to be construed in a limiting sense:

Example I

Eighty-seven grams of a 50% aqueous solution of glycolonitrile (0.764 mol) was admixed with 60 grams of a 50% aqueous solution of sodium hydroxide at 5° C. To this mixture there was added 57 grams of isobutyraldehyde (0.792 mol) with stirring over a forty minute period. The reaction mixture was maintained at a temperature of from about 5° to 10° C. during this forty minute period by external cooling of the reaction mixture. During the addition of the isobutyraldehyde, small amounts of solids precipitated in the reaction mixture. The mixture was stirred for an additional hour at a temperature of 10° to 15° C. and during this period the solids which had precipitated in the reaction mixture dispersed and thinned out to some extent. The cyanohydrin which was produced was hydrolyzed to the desired lactone by adding 161 mls. of concentrated HCl to the reaction mixture, allowing the reaction mixture to stand overnight at room temperature and then heating the mixture at 85° to 90° C. for three hours. In order to remove the undesired glycols which had been produced as by-products of the condensation reaction, the reaction mixture was made strongly alkaline with aqueous sodium hydroxide and then the reaction mixture was subjected to steam distillation. The residue from the steam distillation contained the sodium salt of the desired lactone and was free of undesired glycols. The desired lactone was reformed by heating the mixture for one hour with sufficient concentrated HCl to give the reaction mixture a pH of 1. The reaction mixture was then neutralized with dilute alkali; filtered and then extracted several times with isopropyl acetate. The isopropyl acetate extracts contained the desired lactone. These extracts were dried over anhydrous sodium sulfate, filtered and thereafter the isopropyl acetate removed by distillation. The desired lactone was obtained in a crude yield of 52 grams. Distillation of the crude product in vacuo gave a yield of 49 grams (B. P. 109° C. at 6 mm.) of a white solid which analyzed 95% pure alpha-hydroxy-beta,beta-dimethyl-gamma-butyrolactone.

Example II

To 87 grams of 50% aqueous glycolonitrile (0.764 mol) and 30 ml. of water were added 28.8 grams of calcium hydroxide keeping the temperature of the reaction mixture below 20° C. The mixture was cooled to 5° C. and 57 grams of isobutyraldehyde were added over a 20 minute period keeping the temperature of the reaction mixture between 5° and 10° C. The reaction mixture which was a thick slurry at first thinned out during this addition. The reaction mixture was then stirred for one hour at 10° C. after which it was poured into 161 ml. of concentrated hydrochloric acid. The resulting acid mixture was heated for three hours on a steam bath to hydrolyze the cyanohydrin, which had been produced, to the lactone. After this the acid solution was made strongly alkaline (pH>10) with sodium hydroxide and the alkaline mixture then steam distilled to remove any undesired glycols produced as by-products of the condensation reaction. The alkaline mixture was then acidified with concentrated hydrochloric acid to a pH below 2 and heated for one hour to re-form the lactone. The acid mixture was then cooled and extracted with isopropyl acetate to recover the lactone. The solvent extracts were dried over anhydrous sodium sulfate and the solvent then removed by distillation. The desired lactone which was obtained was vacuum distilled to give 49.5 grams of pure alpha - hydroxy - beta,beta - dimethyl - gamma - butyrolactone (B. P. 125° C. at 16 mm. and 105° C. at 4 mm.).

Having described our invention, what we claim as new and desire to secure by Letters Patent is:

1. A process comprising reacting glycolonitrile with isobutyraldehyde in the presence of an alkaline condensing agent.

2. A process comprising admixing an aqueous solution of glycolonitrile with an alkaline condensing agent and isobutyraldehyde.

3. The process of claim 2 wherein the materials are admixed with each other at a temperature not above about room temperature and approximately equivalent proportions of each material are employed.

4. A process comprising admixing an aqueous solution of glycolonitrile with an aqueous solution of sodium hydroxide and with isobutyraldehyde.

5. The process of claim 4 wherein the materials are admixed with each other at a temperature not above about room temperature and approximately equimolecular proportions of each material are employed.

6. A process comprising admixing an aqueous solution of glycolonitrile with an aqueous solution of potassium hydroxide and with isobutyraldehyde.

7. The process of claim 6 wherein the materials are admixed with each other at a temperature not above about room temperature and approximately equimolecular proportions of each material are employed.

8. A process comprising admixing an aqueous solution of glycolonitrile with an aqueous solution of calcium hydroxide and with isobutyraldehyde.

9. The process of claim 8 wherein the materials are admixed with each other at a temperature not above about room temperature and approximately equivalent proportions of each material are employed.

References Cited in the file of this patent

UNITED STATES PATENTS

| Number | Name | Date |
|---|---|---|
| 2,228,271 | Jacobson et al. | Jan. 14, 1941 |
| 2,259,167 | Kung | Oct. 14, 1941 |
| 2,387,735 | Bersworth | Oct. 30, 1945 |
| 2,443,334 | Van House | June 15, 1948 |
| 2,460,603 | Semon | Feb. 1, 1949 |
| 2,500,018 | Bersworth | Mar. 17, 1950 |

FOREIGN PATENTS

| Number | Country | Date |
|---|---|---|
| 388,874 | Great Britain | Mar. 9, 1933 |